US007529760B2

(12) United States Patent
Jennery

(10) Patent No.: US 7,529,760 B2
(45) Date of Patent: May 5, 2009

(54) USE OF POSITIVE AND NEGATIVE FILTERING WITH FLEXIBLE COMPARISON OPERATIONS

(75) Inventor: Aidon Paul Jennery, El Sobrante, CA (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 11/007,563

(22) Filed: Dec. 8, 2004

(65) Prior Publication Data

US 2006/0122981 A1    Jun. 8, 2006

(51) Int. Cl.
*G06F 17/00* (2006.01)
(52) U.S. Cl. .................................... 707/101
(58) Field of Classification Search ............... 707/1–10, 707/100–104.1, 200–205
See application file for complete search history.

(56) References Cited

U.S. PATENT DOCUMENTS

| | | | |
|---|---|---|---|
| 6,298,340 B1 | 10/2001 | Calvignac et al. ............... 707/3 |
| 6,768,988 B2 | 7/2004 | Boreham et al. ............... 707/3 |
| 6,769,099 B2 | 7/2004 | Li et al. ............... 716/2 |
| 2003/0097357 A1 | 5/2003 | Ferrari et al. ............... 707/3 |
| 2003/0110168 A1 | 6/2003 | Kester et al. ............... 707/6 |
| 2003/0120622 A1* | 6/2003 | Nurmela et al. ............... 706/47 |
| 2004/0039940 A1* | 2/2004 | Cox et al. ............... 713/201 |
| 2004/0161090 A1 | 8/2004 | Digate et al. ............ 379/202.01 |

FOREIGN PATENT DOCUMENTS

JP     01-147724     6/1989     ............ 707/3

OTHER PUBLICATIONS

Tsumoto, Discovery of Knowledge About Drug Side Effects . . . Set Model, 1999 AAAI Symposium Predictive Toxicology of Chemicals: Experiences and Impact of AI Tools, Mar. 22-24, 1999.
Tsumoto, "Automated Knowledge Acquisition from Clinical Databases . . . ", Dept. of Information Medicine, Medical Research Institute, Tokyo Medical and Dental University.
Kusiak, "Data Mining and Decision Making", Proc. Of the SPIE Conf. On Data Mining and Knowledge Discovery: Theory, Tools, and Technology IV, v 4730, pp. 155-165, Apr. 2002.
Norris, "JEP-0062: Packet Filtering: A Framework for Packet Filtering Rules," Jabber Software Foundation, n.0062, v.0.2, last updated Sep. 30, 2003.

* cited by examiner

*Primary Examiner*—Hosain T Alam
*Assistant Examiner*—Navneet K Ahluwalia
(74) *Attorney, Agent, or Firm*—Sandra M. Parker, Esq.

(57) ABSTRACT

A computer-based filtering method driven by a ruleset for positive and negative filtering with flexible comparison operations. Method first creates a ruleset as an ordered collection of rules which has a single ruleset default action. Each rule has a rule action, a comparison operation and at least one comparison data element. Filtering of an object from the ruleset result set is performed with the comparison operation on the object and the comparison data from the ruleset. Filtering step invokes each rule from the ruleset to compare the object with each comparison data element to determine whether or not the object is to be included or excluded from the result set. Filtering stops after the first matching rule is found and then the rule action is taken, or after invoking all rules without finding the matching rule and then the ruleset default action is taken.

7 Claims, 4 Drawing Sheets

US 7,529,760 B2

USE OF POSITIVE AND NEGATIVE FILTERING WITH FLEXIBLE COMPARISON OPERATIONS

BACKGROUND OF THE INVENTION

1. Field of the Invention

This invention relates in general to content management systems performed by computers, and in particular to a method for highly efficient, flexible, data-driven generic filtering system.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

A typical database management system includes both database files and index files. The database files store data in the rows and columns of tables stored on data pages. In such a table, the rows may correspond to individual records while the columns of the table represent attributes of the records. For example, in a customer information table of a database management system, each row might represent a different customer while each column represents different attributes of the customers, such as the name of each customer, the amount owed by each customer and the cash receipts received from each customer.

Instead of providing for direct sorting and searching of the records in the tables, the database management system relies on the index files which contain information about or pointers to the location of the records in the tables stored in the database files. The index file can be searched and sorted (scanned) much more rapidly than can the database files. An index file is scanned through transactions in which criteria are stipulated for selecting records from a table. These criteria include keys which are the attributes by which the database finds the desired record or records using the index. The actions of a transaction that cause changes to recoverable data objects are recorded in a log. In database management systems all data are stored in tables on a set of data pages that are separate from the index file. A table can have one or more indexes defined on it, each of which is an ordering of keys of the row of the tables and is used to access certain rows when the keys are known.

Large database archives, such as the ones used in audio and video libraries of media and other communications industries and educational institutions, depend on content management systems and their media indexing applications to create accurate indexes in order to locate and manage the archived content. Many database elements are complex nested objects and proper filtering is critical for efficient search and management of these objects in large archives or content collections. Current filtering methods perform positive and negative filtering based on simple lists. Positive filtering is used to include an object. Negative filtering is used to exclude an object. However, the methods using simple lists for comparison operations are too inflexible for the needs of many projects. Other conventional methods include hard coding of the filtering data. While this is the most flexible option, these methods require code changes whenever updates are required.

Therefore, there is a need for a simple, optimized and generic method and system that is both data-driven and very flexible, allowing for both positive and negative filtering in a simple, efficient, easy to implement module of a content management system, such as a database management system.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based filtering method driven by a ruleset for positive and negative filtering with flexible comparison operations. Method first creates a ruleset as an ordered collection of rules which has a single ruleset default action. Each rule has a rule action, a comparison operation and at least one comparison data element. Filtering of an object from the ruleset result set is performed with the comparison operation on the object and the comparison data from the ruleset. Filtering step invokes each rule from the ruleset to compare the object with each comparison data element to determine whether or not the object is to be included or excluded from the result set. Filtering stops after the first matching rule is found, and then taking the rule action, or after invoking all the rules without finding the matching rule and then taking the ruleset default action.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a method for highly efficient generic filtering system with flexible comparison operations, allowing for both positive and negative filtering. It is implemented in the Lotus Workplace Business Controls and Reporting (LWBCR) archive utility shipped with IBM® LWBCR version V2.

Figure 1:
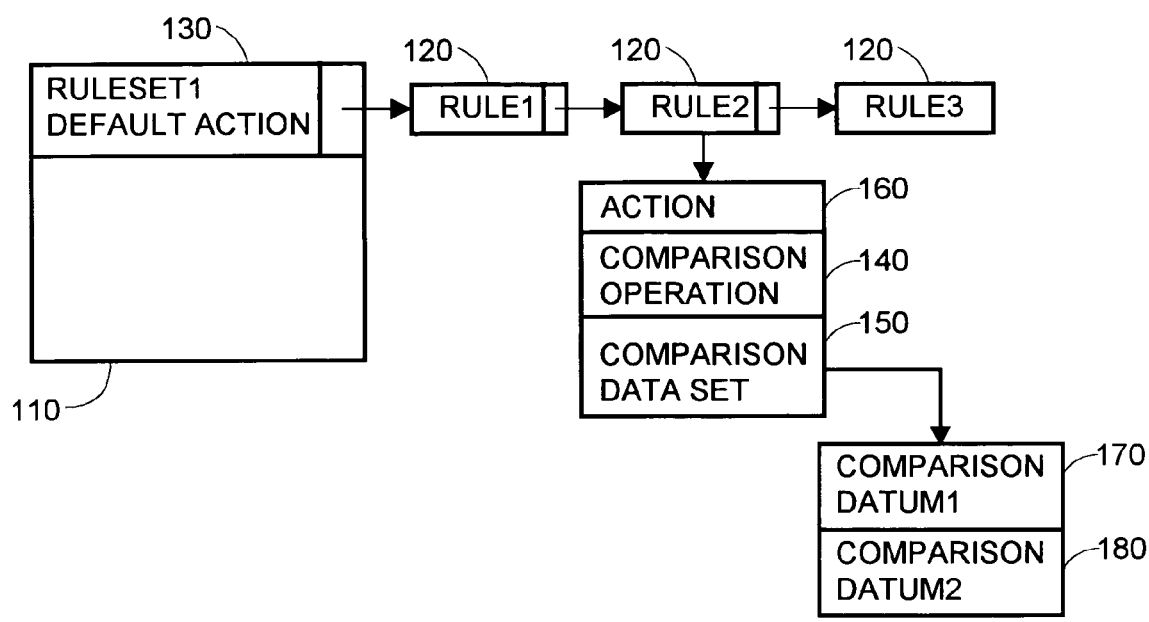
FIG. 1 illustrates data structures of an exemplary ruleset, according to the preferred embodiments of the present invention.

In the preferred aspects of the present invention the filtering is driven by a ruleset, such as a ruleset1 110 illustrated in FIG. 1. A ruleset contains an ordered collection of filtering rules 120 and a ruleset default action 130, performed after all the rules from the ruleset have been exhausted. A rule consists of a comparison operation 140, comparison data 150, used during the comparison and a rule action 160, performed when the comparison was successful. The rule action and the ruleset default action are used to include or exclude the object from a result set.

To decide whether an object from an input set is to be included or excluded from the result set each rule from the ruleset is invoked against the object attribute, in an order decided upon in advance. The order is arranged to maximize probability of determining whether object attribute satisfies a rule while minimizing a number of rules that must be compared with the object. Comparison operation is performed on the object attribute, by comparing each rule comparison data with the object attribute, and it results in either true or false value. If there is a successful comparison, it is deemed a hit. Otherwise, there is no hit. If there is a hit, the rule action to include or exclude is obeyed for this object. No further processing on this object is performed and no more rules are invoked. If there is no hit, the next rule is invoked and comparison is performed the same way. The process continues until there is a hit or all rules from the ruleset have been invoked. If all rules have been invoked and there was no hit, the ruleset default action, to include or exclude, is applied to the object.

In the present invention the rule comparison data may include a single comparison data value or a set of multiple data values, all supplied for the same comparison operation. These values may be stored in an array, table, linked list or a similar database data structure, and are sequentially compared with the object attribute. FIG. 1 shows two values of comparison data, comparison datum1 170 and comparison datum2 180.

Basic advantages of the present invention are its flexibility, modularity and extensibility. Flexibility is shown in the present invention by the fact that each rule itself can contribute to a decision whether to include or exclude an object from the result set. When the rule has no comparison data for the object, it allows other rules from the ruleset to be used on the object. If no rules are specified for an object, this allows the ruleset default action to be performed on the object. Another advantage of the present invention is the fact that it is implemented in modules. Thus, it is simple to add different comparison operations to the code and incorporate them in the ruleset. Further, comparison data is defined in modules outside the code, and can be easily modified. Moreover, multiple comparison data elements may be specified for a single rule and comparison operation, thus allowing a range of values to be compared with the object. In the present invention rules are always executed in a defined order allowing for efficient and optimal encoding of the ruleset.

In the preferred aspects of the present invention the ruleset is implemented in Java programming language. Before any filtering can occur, the ruleset is created as a Java class. Each instance of the ruleset class is created by reading the data for the ruleset from a filtering properties file. An exemplary ruleset from a filtering property file is given below.

```
#########################################
# ATTR
# Allow all starting with "SO" but
# filter out all standard CM objects
RULE_ATTR_1_ACTION            = EXCLUDE
RULE_ATTR_1_COMPARISON        = EQUALS
RULE_ATTR_1_COMPDATA_1        = SOURCE
RULE_ATTR_2_ACTION            = INCLUDE
RULE_ATTR_2_COMPARISON        = STARTS
RULE_ATTR_2_COMPDATA_1        = SO
RULE_ATTR_DEFAULT             = EXCLUDE
#########################################
```

This exemplary ruleset has two rules and a designated ruleset default action. The ruleset name is ATTR. The first rule in the ruleset (RULE_ATTR_1_*) is an EQUALS comparison operation. For this comparison operation there is only one element of comparison data to be used, which is data with value "SOURCE". The action for this rule is to EXCLUDE the matching object. The second rule (RULE_ATTR_2_*) has a STARTS comparison operation, with data "SO". The action for this rule is to INCLUDE. The ruleset has a ruleset default action of EXCLUDE.

In the preferred implementation of the present invention, each rule is created as a rule inner class contained by the ruleset class. Algorithm for an exemplary filtering procedure, named ruleset.keep( ), is illustrated by a flowchart of FIG. 2. Routine ruleset.keep( ) can be declared in Java as boolean ruleset.keep(Attribute attribute). In order to perform filtering, the client application code needs to call the keep( ) method of the ruleset, passing it the attribute of the object it is filtering on. The keep( ) method returns the value true, if this object is not to be filtered out and the value false, if it is to be discarded.

Figure 2:
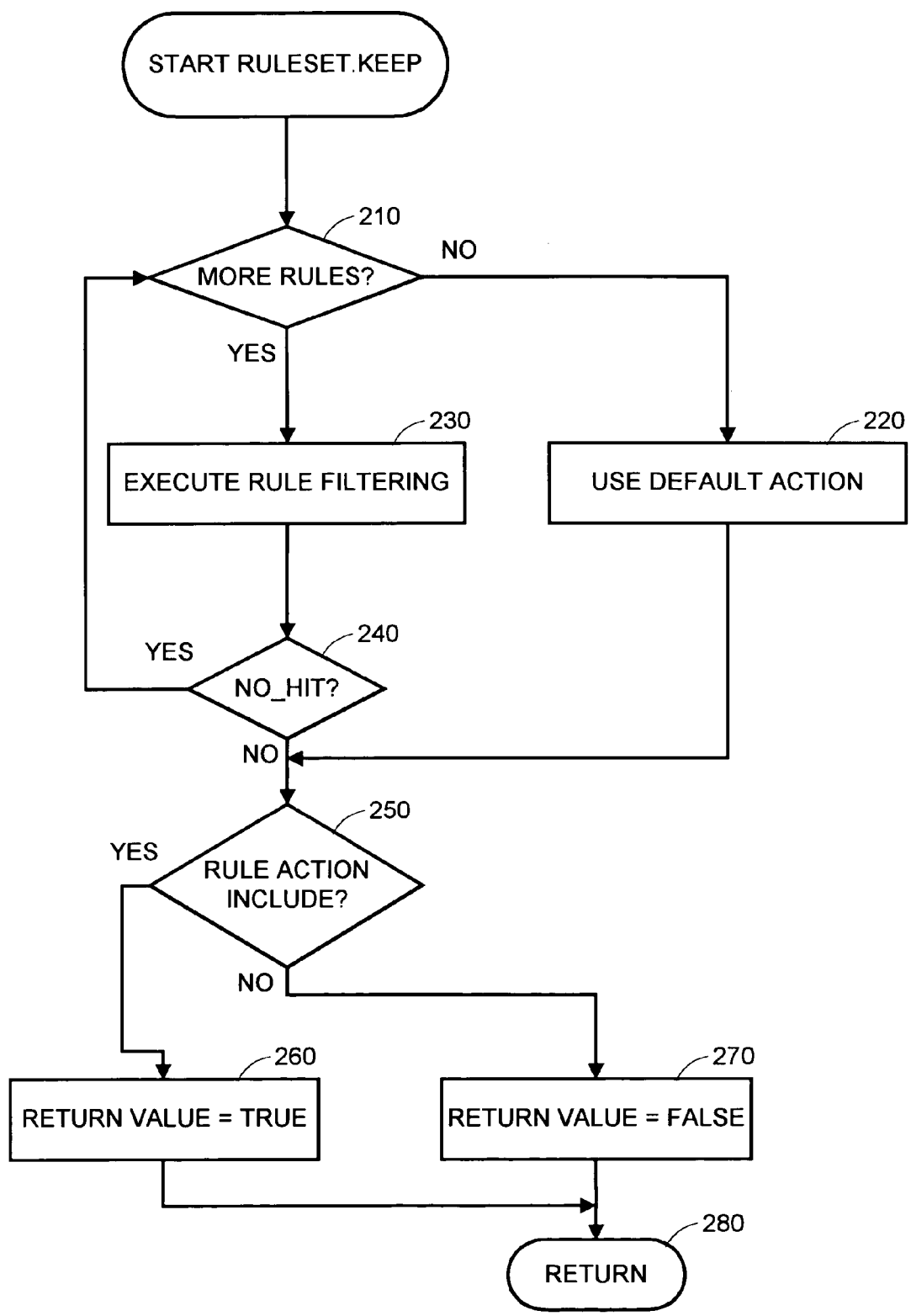
FIG. 2 illustrates a flowchart for filtering a ruleset, according to the preferred embodiments of the present invention.

According to FIG. 2, the keep( ) method of the ruleset steps through the contained list of rules (rule objects) in a rule filtering step 230, calling their filter( ) methods with an object attribute. The filter( ) method can return NO_HIT, INCLUDE or EXCLUDE. If step 240 returns NO_HIT, the process continues at step 210 to call a filter( ) method of the next rule, in step 230. If a rule action INCLUDE is returned in step 250, no more rule objects are used and the keep( ) method returns the value true in step 260 and returns in step 280. If step 250 does not return INCLUDE, the rule action is EXCLUDE, so no more rule objects are used and the keep( ) method returns the value false in step 270 and returns in step 280. If all rule objects return NO_HIT and there are no more rules detected in step 210, the process uses the ruleset default action in step 220 and continues with step 250. A ruleset default action of EXCLUDE means that keep( ) will return the value false in step 270 and a ruleset default action of INCLUDE means that keep( ) will return the value true in step 260. Routine returns in step 280.

Figure 3:
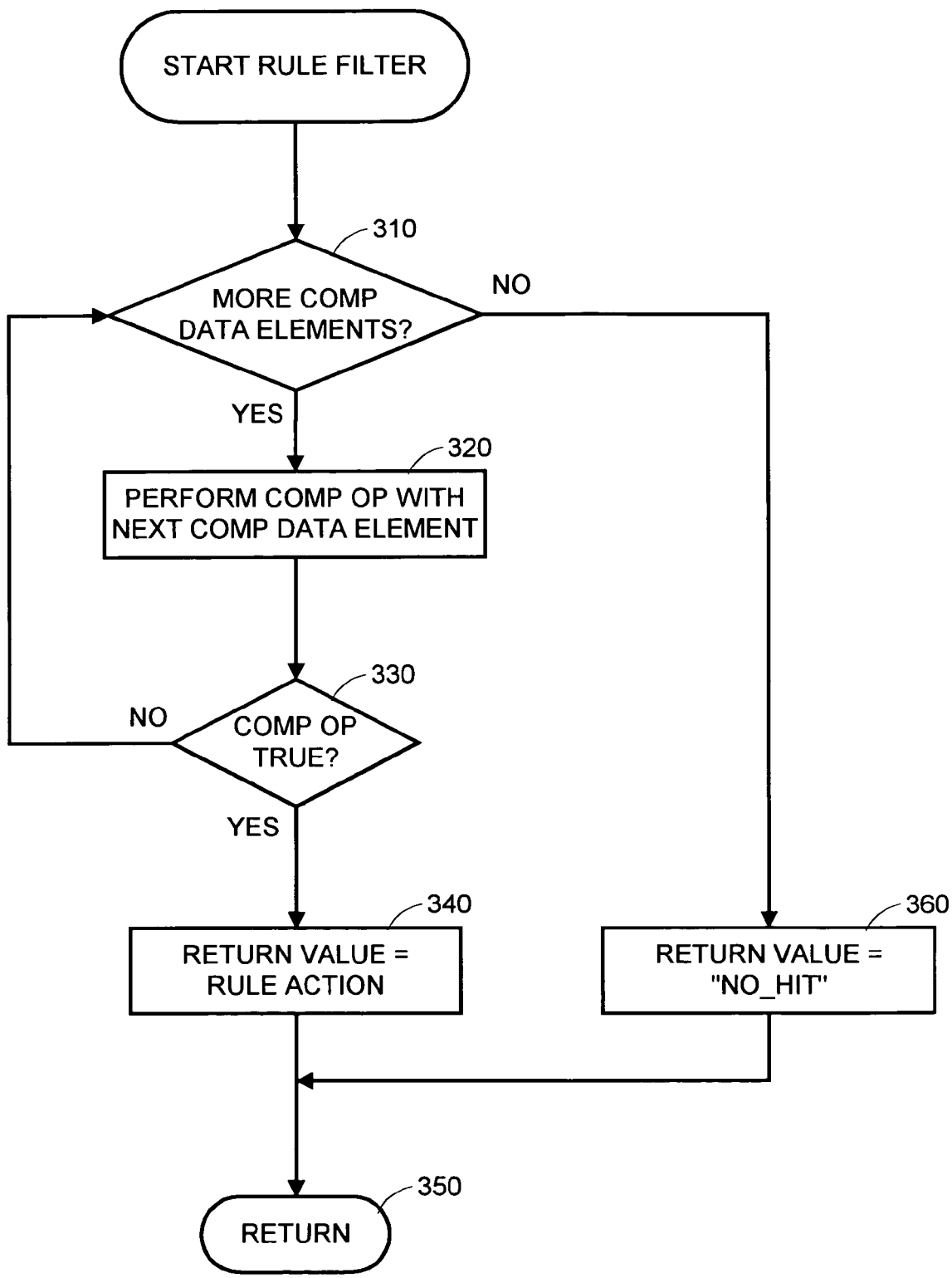
FIG. 3 illustrates a flowchart for filtering a rule; according to the preferred embodiments of the present invention.

Algorithm of the rule filtering step 230 of FIG. 2, is shown in a flowchart for the routine rule.filter( ), provided in FIG. 3. Routine rule.filter( ) can be defined in Java as int rule.filter (Attribute attribute) and is applicable to rules having more than one element of comparison data. Routine rule.filter( ) starts in step 310, where it checks whether there are more comparison data elements to be compared with the object. If more elements exist, step 320 performs comparison operation with the next comparison data element. If the comparison was successful and the value true was returned in step 330, the rule action, either EXCLUDE or INCLUDE, is returned in step 340 and the routine returns in step 350. If the comparison of step 330 was unsuccessful, the routine continues, in step 310, with another comparison data element. If no more elements are found, step 360 returns value NO_HIT and the routine returns in step 350.

While some preferred aspects of the present invention are implemented with the comparison operations defined inline, in the rule class, other implementations are possible. For example, the comparison operations can be defined as independent classes that implement a comparison operation interface, such as a pointer, which makes it easier to add the comparison operations. In another preferred aspect of the present invention the comparison operation can be the class name that implements that comparison operation, providing a fully dynamic comparison system.

In the exemplary ATTR ruleset shown above, after creating the ruleset object, the client can call keep(String objectAttribute) to determine whether that particular object should be kept or discarded by filtering it out from a result set. Thus, in the above example, calling keep("SOURCE") would return the false value and the object will be EXCLUDE-ed by the rule 1 from the result set. Calling keep("SOFT") would return the true value and the object will be INCLUDE-ed by rule 2 to the ruleset result set. Calling keep("HARD") would return the false value and the object will be EXCLUDE-ed from the ruleset result set by the ruleset default action.

Another exemplary aspect of the present invention includes multiple comparison data supplied for the same comparison operation, as shown below.

```
######################################
# LINKTYPE
# Filter out all standard CM objects
RULE__LINKTYPE__1__ACTION          = EXCLUDE
RULE__LINKTYPE__1__COMPARISON      = EQUALS
RULE__LINKTYPE__1__COMPDATA__1     = Contains
RULE__LINKTYPE__1__COMPDATA__2     = DKFolder
RULE__LINKTYPE__DEFAULT            = INCLUDE
######################################
```

In this example, LINKTYPE ruleset rule 1 has two comparison data elements, although it can be much more complex. Thus, when rule 1 executes, it first performs the EQUALS comparison operation on the input attribute with the comparison datum "Contains". If that comparison returns the value true, the filter( ) returns EXCLUDE and keep( ) returns the value false. Otherwise, the process performs the comparison with the comparison datum "DKFolder". If that comparison returns the value true, the filter( ) returns EXCLUDE and keep( ) returns the value false. Otherwise, final step returns INCLUDE, from the ruleset default action, and keep( ) returns true.

The present invention does not limit the number or type of comparison operations that could be implemented in any particular embodiment. Perceived comparison operations for character and string data types include EQUALS, EQUALS_IGNORE_CASE, STARTS, STARTS_IGNORE_CASE, ENDS, ENDS_IGNORE_CASE, CONTAINS, CONTAINS_IGNORE_CASE, REGULAR_EXPRESSION_MATCH and others. Other types of attributes may require similar or different comparison operations and the present invention is not limited to any data type or comparison operation. It should be noted that while the preferred aspects of the present invention are shown using strings for attributes and comparison operation data, the invention is not limited to strings and any form of data used for the attributes and comparison operations is envisioned by this invention.

Moreover, while a Java properties file was used for creation of the exemplary ruleset, the present invention is not limited to rulesets created only in this manner. Other exemplary ways to create rules and ruleset could include Windows .INI files, predefined code data structures, XML or the like. Presently, XML allows for a most flexible definition of rulesets and is more appropriate than a properties file. The schema for XML rules and rulesets could be defined in a number of different ways. An exemplary way of defining the ATTR ruleset, shown above, using an element-based XML approach is presented below.

```
<ruleset name="ATTR">
    <rule>
        <action>EXCLUDE</action>
        <comparison>EQUALS</comparison>
        <compdata>SOURCE</compdata>
    </rule>
    <rule>
        <action>INCLUDE</action>
        <comparison>STARTS</comparison>
        <compdata>SO</compdata>
    </rule>
    <default>EXCLUDE</default>
</ruleset>
```

The LINKTYPE ruleset, shown above, using the XML form for demonstrating multiple comparison data elements for a single rule is presented below.

```
<ruleset name="LINKTYPE">
    <rule>
        <action>EXCLUDE</action>
        <comparison>EQUALS</comparison>
        <compdata>Contains</compdata>
        <compdata>DKFolder</compdata>
    </rule>
    <default>INCLUDE</default>
</ruleset>
```

An attribute-based approach to the schema would yield different XML for the same ruleset. There are many other ways of encoding the rule and ruleset data of the present invention, in many different formats.

While the invention may be implemented in a vast number of ways, the present invention is directed to a flexible filtering system driven by a ruleset and to the basic algorithms for operating on the ruleset data. Ruleset is an ordered collection of rules, containing from zero to n rules positioned in a specific order and a single ruleset default action. A rule contains a rule action, a comparison operation and at least one comparison data element for filtering objects from the result set by object attributes. Each rule from the ruleset is sequentially invoked against the object attribute to determine whether or not an object is to be included or excluded from the result set. Ruleset processing stops after the first matching rule is found, when a rule action is taken, or after all rules are exhausted, when a ruleset default action is taken.

Present invention can be extended to include a comparison operation on a complete object, rather than just on an attribute of the object. In this more generic filtering system, the comparison data elements may be multidimensional elements, allowing for more complex comparison operations. Due to the implementation modularity of the present invention, the comparison data elements could be "references" to actual objects. The objects may be held in the system or stored externally, and one implementation of these objects includes Java serialized objects. Further, the rule action may be extended beyond INCLUDE and EXCLUDE action, to include other possible filtering actions, such as item redirection or error notification, etc. Moreover, the preferred aspects of the present invention may be invoking each rule according to an optimized selection method, which does not have to be a sequential order.

Figure 4:
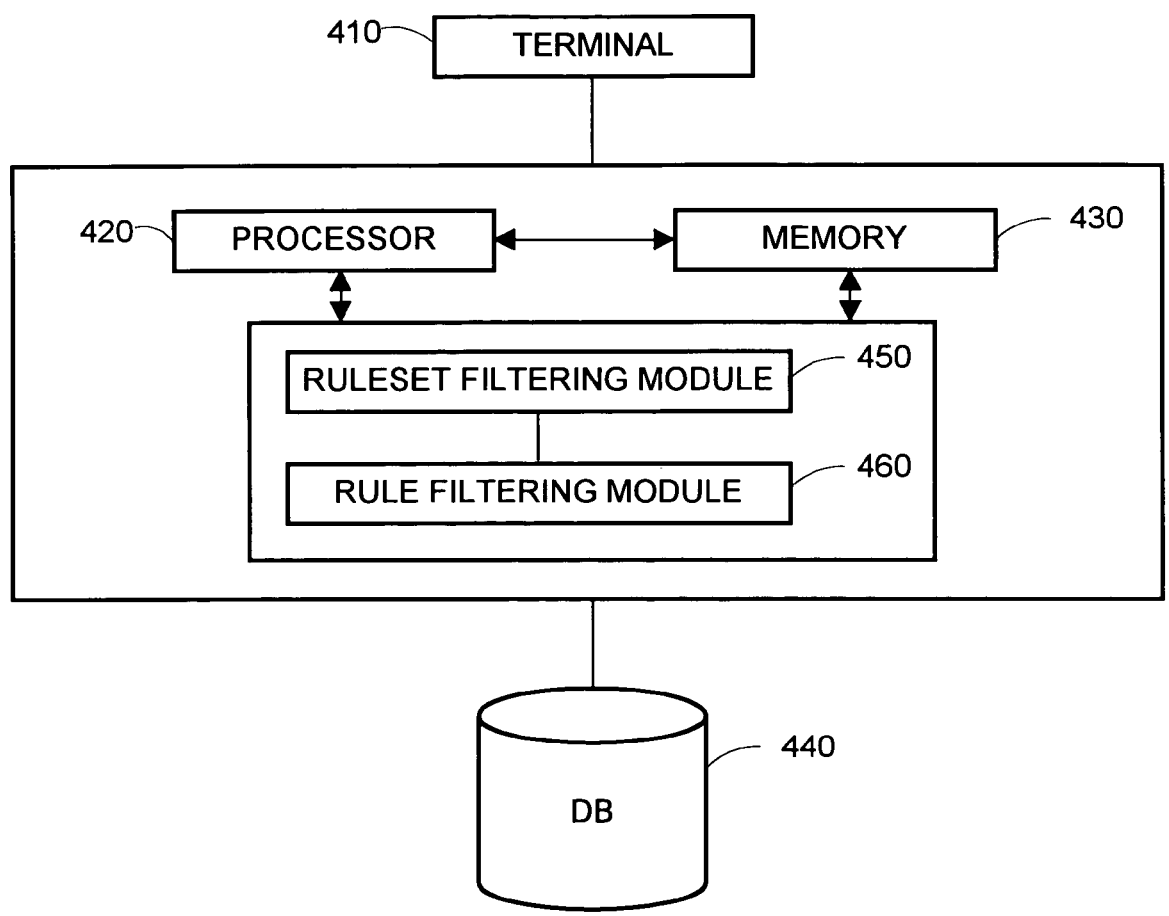
FIG. 4 illustrates a hardware and software environment enabling efficient filtering, according to the preferred embodiments of the present invention.

The present invention can be realized in hardware, firmware or software, any combination of hardware, firmware and software, or in any other process capable of providing the disclosed functionality. Implementation of the method and system of the present invention can be realized in a centralized fashion in one computer system, or in a distributed fashion where different elements are spread across several interconnected computer systems. Any type of computer system or apparatus adapted for carrying out the methods described herein is suited to perform the functions described herein. FIG. 4 illustrates a general purpose computer system with a group of computer programs which, when being loaded and executed, control the computer system in such a way that it carries out the method aspects of the present invention. The computer programs can be embedded in a computer usable medium which comprises all the features enabling the implementation of the methods described herein and which are able to carry out these methods when loaded in a computer system.

In the exemplary environment of FIG. 4, a computer system is comprised of one or more processors 420 with computer memory 430, connected to one or more electronic storage devices 440, such as disk drives, that store one or more relational databases. These drives may comprise, for example, optical disk drives, magnetic tapes and/or semiconductor memory. Operators of the computer system use a standard operator terminal interface 410, such as IMS/DB/DC, CICS, TSO, OS/2 or other similar interface, to transmit electrical signals to and from the computer system, that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM® for the MVS or OS/2 operating systems. Those skilled in the art will recognize, however, that the present invention has application to any RDBMS software that uses SQL, and may similarly be applied to non-SQL queries. Moreover, the present invention is not limited to database management systems but is applicable to any content management system.

Software components of the computer system of FIG. 4 include a ruleset filtering module 450 and a rule filtering module 460. These software modules are connected to the memory 430 and storage devices 440, in data structures of the present invention, such as tables, arrays, linked lists, etc., needed for the ruleset filtering. A target object is entered by user of the terminal 410 or in some other way. The system uses the algorithm for the ruleset filtering shown in the flowchart of FIG. 2 and the algorithm for rule filtering shown in the flowchart of FIG. 3.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based filtering method driven by a ruleset for positive and negative filtering with flexible comparison operations, comprising:
   (a) creating a ruleset as an ordered collection of rules and having a single ruleset default action, wherein each said rule having a rule action, a comparison operation and at least one comparison data element; and
   (b) filtering an object from a ruleset result set by performing the comparison operation on the object and the comparison data element from the rule, wherein:
   the filtering step is invoking rules from the ruleset one-by-one to compare the object with each rule comparison data element to determine a next action, and
   the filtering step either stops after a first matching rule is found and the filtering comprises taking the rule action, or the filtering step stops after invoking all rules without finding a matching rule and the filtering comprises taking the ruleset default action,
   the method being implemented by a code being selected from the group comprising Java language, Windows .INI files, predefined code data structures and XML language.

2. The method according to claim 1, wherein the next action is whether or not to include or exclude the object from the result set.

3. The method according to claim 1, wherein the filtering step is invoking each said rule sequentially.

4. The method according to claim 1, wherein the filtering step is invoking each said rule according to an optimized selection method.

5. The method according to claim 1, wherein the method being implemented in the Lotus Workplace Business Controls and Reporting (LWBCR) archive utility.

6. The method according to claim 1, wherein the comparison data element being a multidimensional element, allowing for a complex comparison operation with the object.

7. The method according to claim 1, wherein the comparison data element and/or comparison operation being referenced by an interface.

* * * * *